(No Model.)
W. E. CONNELLY.
GATE.
No. 318,087. Patented May 19, 1885.
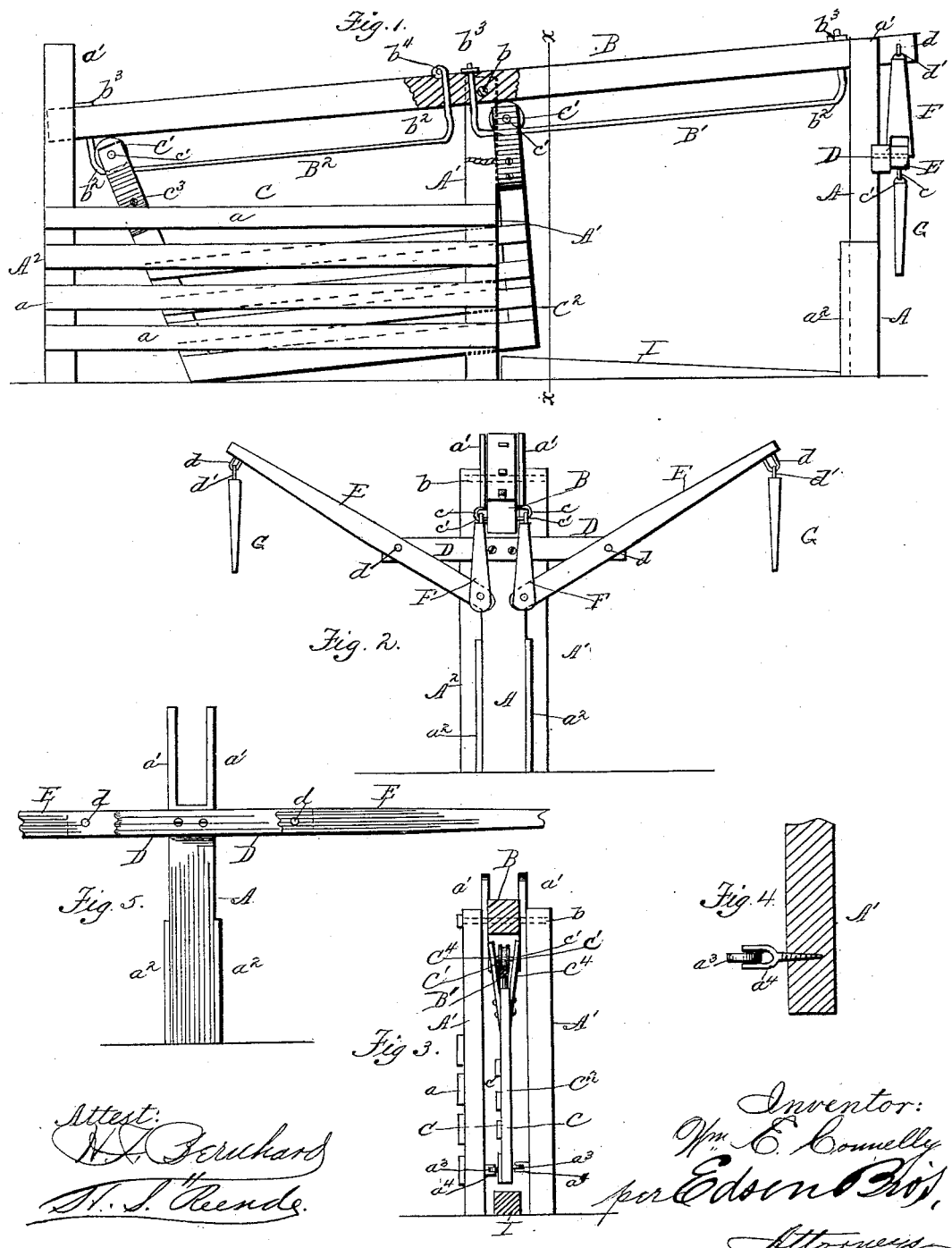

UNITED STATES PATENT OFFICE.

WILLIAM E. CONNELLY, OF HUBBARD, TEXAS.

GATE.

SPECIFICATION forming part of Letters Patent No. 318,087, dated May 19, 1885.

Application filed November 12, 1884. (No model.)

*To all whom it may concern:*

Be it known that I, WILLIAM E. CONNELLY, a citizen of the United States, residing at Hubbard, in the county of Hill and State of Texas, have invented certain new and useful Improvements in Gates, of which the following is a specification, reference being had therein to the accompanying drawings.

My invention relates to improvements in that class of gates in which the gate is suspended from and adapted to traverse a supporting-beam adapted to oscillate and cause the gate to travel back and forth by gravity, according to the position the beam occupies, and has for its object to provide a gate and its operating mechanism which shall be simple and durable in construction, and capable of being readily and easily operated by a horseman or driver of a team approaching the same from either direction.

The invention consists in the construction, arrangement, and combination of parts, substantially as hereinafter described and claimed.

In the drawings, Figure 1 is a side elevation of a gate embodying my improvements, showing the gate open. Fig. 2 is a front elevation thereof, showing the gate closed. Fig. 3 is a vertical section on the line $x\ x$ of Fig. 1, and Figs. 4 and 5 are detail views of parts of my improvements.

Similar letters of reference in the several drawings denote like or corresponding parts.

Referring to the drawings, A A' designate the gate-posts, and $A^2$ a fence-post, having rails $a$ secured thereto and to the post A'.

B designates a beam, pivoted centrally at $b$, and having rods B' $B^2$ secured thereto, on which supporting-rollers C' of a gate, C, are adapted to travel. The gate is composed of vertical and inclined uprights $C^2\ C^3$, connected together by bars $c\ c$, each of said uprights having a pulley or roller, C', mounted at $c'$ in upwardly-extending and laterally-diverging pieces $C^4$, secured at the upper ends thereof, as clearly shown in Fig. 3.

It will be seen by reference to Fig. 1 that the rod B' is extended beyond the pivot of the beam B and the posts A' to enable the gate to fit snugly between the said posts A', and thereby be out of the way of passing vehicles; and it will be further observed that in order to allow the roller of the upright $C^3$ to slide freely on rod $B^2$ without straining the same the said upright is inclined or arranged at an angle to its fellow $C^2$. The posts A' are arranged in pairs at such a distance apart as to permit the beam B to freely oscillate, while the posts A $A^2$ are bifurcated or cut away at their upper ends to provide arms $a'\ a'$, which guide the beam in its movement, the depth of the cut being such as to permit the beam to be inclined at such an angle as to cause the gate to quickly gravitate in either direction, and to act as a stop to limit the downward movement of the beam. The ends of the rods B' $B^2$ are bent at right angles thereto, and are curved, as at $b^2$, against which the rollers snugly fit, as shown, the bent ends of said rods being passed through the beam and provided with nuts, as $b^3$; or the said rods may be bent and have a key passed through the same, as at $b^4$, Fig. 1. The rods B' $B^2$ are arranged beneath, and protected from snow and ice by the beam, and are of such a length that when the gate is closed the rollers C' of the gate proper will fit into the curved portions $b^2$ of the rods, which thereby serve as a stop to limit the forward or rearward movement of said gate. The post A is provided at its lower end with cleats $a^2$, between which the gate fits when closed, while each of the posts A' are provided with frictional rollers $a^3$, mounted in brackets $a^4$, which are adapted to bear against the lower bar of the gate and prevent lateral movement thereof at its bottom.

D designates a cross-bar, rigidly secured to the post A near its upper end, at the outer ends of which are pivoted, as at $d$, the operating-levers E, having their forward ends pivoted to links F, connected to the forward end of the beam B at the sides thereof by staples $c\ c'$, which interlock, as shown in Fig. 2. The operating-levers are provided with handles G, connected thereto by staples $d\ d'$ and depending from said levers within easy reach of the operator standing on the ground, riding, or driving.

I designates a tapering block, sunk in the ground between the posts A A', and closing the space between the gate and ground when the beam is depressed at its forward end and the gate is closed, thereby preventing pigs, &c., from passing under the gate.

The operation of my invention is as follows: When it is desired to open the gate, the outer ends of the levers E are depressed by pulling in a downward direction upon the handles G, thereby elevating the links F and the forward end of the beam, and permitting the gate to open by gravity, thus allowing a horseman or driver and team to pass without dismounting to open the gate. To close the gate, it is only necessary to elevate the levers E, and thereby depress the links and forward end of the beam, when the gate will automatically slide forward and close.

It will be observed that the gate and its operating mechanism is simple and durable in construction, and that the gate will freely and readily move in either direction to open or close the same without lateral play, while by locating and securing the rods $B'$ $B^2$ beneath the beam B they will be protected from the accumulation of ice and snow thereon. It will be further observed that the beam is limited in its oscillating movement by striking the posts within the bifurcated portions thereof, and that the rollers of the gate, by striking against the bent ends of the rods, will limit the forward and backward movements thereof, thereby preventing the gate proper from striking against the posts.

Modifications in details of construction and form and proportion of parts may be made without departing from the principle or sacrificing the advantages of my invention—as, for instance, in lieu of bifurcating the posts they may be provided with strips which are of sufficient length to guide the beam, and that any means for flexibly connecting the levers may be substituted for the staples herein shown; also, the rods may be secured to the beam by any suitable means. I would therefore have it understood that I hold myself at liberty to make such changes and alterations as fairly fall within the scope of my invention.

What I claim, and desire to secure by Letters Patent of the United States, is—

1. In a gate, the combination, with the fence and gate posts, of a centrally-pivoted oscillating beam having two rods separately secured thereto and arranged beneath the same, a gate consisting of parallel bars and a vertical and an inclined upright to which said bars are secured, each of said uprights having bearing-rollers mounted in separate brackets secured thereto, and operating-levers pivoted to a cross-bar of the post A and to links connected to the beam, substantially as and for the purpose set forth.

2. In a gate, the combination of the following elements: posts A $A^2$, bifurcated at their upper ends, pivotal posts $A'$, having frictional rolls $a^2$, adapted to bear on the lower bar of the gate, beam B, pivoted at $b$ to the posts $A'$, and having rods $B'$ $B^2$, secured thereto beneath the same, gate C, consisting of parallel bars and uprights, each of the latter having bearing-rollers mounted in brackets secured at the upper ends thereof, as at $c^4$, bar D, secured to the post A, levers E, pivoted to said bar and having operating-handles G, and links F, pivotally connected to the levers E and forward end of the beam B, all arranged and combined substantially as shown and described.

In testimony whereof I affix my signature in presence of two witnesses.

WILLIAM E. CONNELLY.

Witnesses:
J. M. RICH,
A. M. CRAIG.